US008676869B2

(12) United States Patent  
Haartsen et al.

(10) Patent No.: US 8,676,869 B2  
(45) Date of Patent: Mar. 18, 2014

(54) ADAPTIVE DISPLAY FOR ENHANCING AUDIO PLAYBACK

(75) Inventors: Jacobus Cornelis Haartsen, Hardenberg (NL); Sten Minör, Lund (SE); Bengt Stavenow, Lund (SE); William O. Camp, Jr., Chapel Hill, NC (US); Ronald A. Louks, Durham, NC (US); Björn Martin Gunnar Lindquist, Bjärred (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 877 days.

(21) Appl. No.: 12/209,300

(22) Filed: Sep. 12, 2008

(65) Prior Publication Data  
US 2010/0017438 A1 Jan. 21, 2010

Related U.S. Application Data

(60) Provisional application No. 61/081,821, filed on Jul. 18, 2008.

(51) Int. Cl.  
*G06F 7/00* (2006.01)  
*G06F 17/00* (2006.01)  
*G06F 17/30* (2006.01)  
*G06K 9/00* (2006.01)

(52) U.S. Cl.  
USPC .......................... 707/899; 707/758; 382/124

(58) Field of Classification Search  
USPC .......... 707/758, 783, 899; 709/204, 223, 226; 705/1.1, 5, 14; 382/100  
See application file for complete search history.

(56) References Cited

U.S. PATENT DOCUMENTS

| 6,311,214 | B1 * | 10/2001 | Rhoads | 709/217 |
| 6,442,285 | B2 * | 8/2002 | Rhoads et al. | 382/100 |
| 6,522,769 | B1 * | 2/2003 | Rhoads et al. | 382/100 |
| 7,293,227 | B2 | 11/2007 | Plastina et al. | |
| 7,444,353 | B1 * | 10/2008 | Chen et al. | 1/1 |
| 7,628,320 | B2 * | 12/2009 | Rhoads | 235/375 |
| 8,190,606 | B2 | 5/2012 | Kim et al. | |
| 2002/0033844 | A1 * | 3/2002 | Levy et al. | 345/744 |
| 2006/0034478 | A1 * | 2/2006 | Davenport | 381/381 |
| 2007/0061759 | A1 | 3/2007 | Klein, Jr. | |
| 2009/0228466 | A1 | 9/2009 | Peters et al. | |

FOREIGN PATENT DOCUMENTS

| CN | 1902624 A | 1/2007 |
| CN | 1980302 A | 6/2007 |
| CN | 101002201 A | 7/2007 |
| WO | 2007021996 A | 2/2007 |

OTHER PUBLICATIONS

International Search Report mailed Mar. 24, 2009 for International Application No. PCT/US2008/079794 filed Oct. 14, 2008.  
CN Search Report issued Oct. 17, 2012 in re CN Application No. 200880130419.1 filed on Jan. 17, 2011.

* cited by examiner

*Primary Examiner* — Susan Chen  
(74) *Attorney, Agent, or Firm* — Coats & Bennett, P.L.L.C.

(57) ABSTRACT

An audio playback device and method searches initiates a web search for images related to music or other audio files being played, downloads images from selected web pages returned by the search engine, and outputs one or more images from the selected web pages on a display to enhance the user's listening experience.

14 Claims, 4 Drawing Sheets

ADAPTIVE DISPLAY FOR ENHANCING AUDIO PLAYBACK

RELATED APPLICATION

This application claims the benefit of U.S. Provisional Patent Application 61/081,821 filed Jul. 18, 2008, which is incorporated herein by reference.

BACKGROUND

The present invention relates generally to a method and apparatus for enhancing audio playback and, more particularly, to a method and apparatus for selecting and displaying images on a display of an audio playback device to enhance audio playback.

Advances in digital electronic technology have led to a rapid growth in portable audio devices. In particular, portable audio devices such as audio CD players, digital audio players, FM/AM radio receivers, televisions, and DVD players have become increasingly popular among consumers as the size and weight of such devices has become small enough for users to easily carry. It is also becoming increasingly common for cellular telephones, personal digital assistants (PDAs), and other wireless devices to incorporate audio playback capabilities so that consumers can use their cellular phones or other wireless devices as portable audio players.

Many portable audio players include a display that is capable of displaying visual content such as images and videos. The display can be used to display visual content relating to audio files being played, such as album art and concert videos. Typically, the user downloads visual content (e.g., images and/or videos) related to the user's audio files, links the visual content with the audio files, and stores the visual content in memory. When an audio file is played, the related visual content can be retrieved from memory and output to the display. Unfortunately, the visual content is limited to what the user has downloaded and stored in memory of the user's device or to what is offered by the audio content provider.

SUMMARY

The present invention provides a method and apparatus to download and display visual content from web servers in response to the selection or playing of audio files. When a user selects or plays an audio file, the artist's name, song title, album title, or other textual information related to the audio file is used to search for publicly-accessible web pages containing related images. Related images may, for example, comprise album art, images of the performing artist, concert videos, etc. In embodiments of the present invention, the user's device formulates a query using, for example, the artist's name, sends the query to a web search engine, and initiates a web search for related images available in publicly-accessible web pages. When search results are returned by the web search engine, the user's device filters the search results, downloads selected web pages, extracts images from the web pages, and outputs the images to the display. The images can be displayed full screen or may be converted to wallpaper that is displayed in the background.

DETAILED DESCRIPTION

Figure 1:
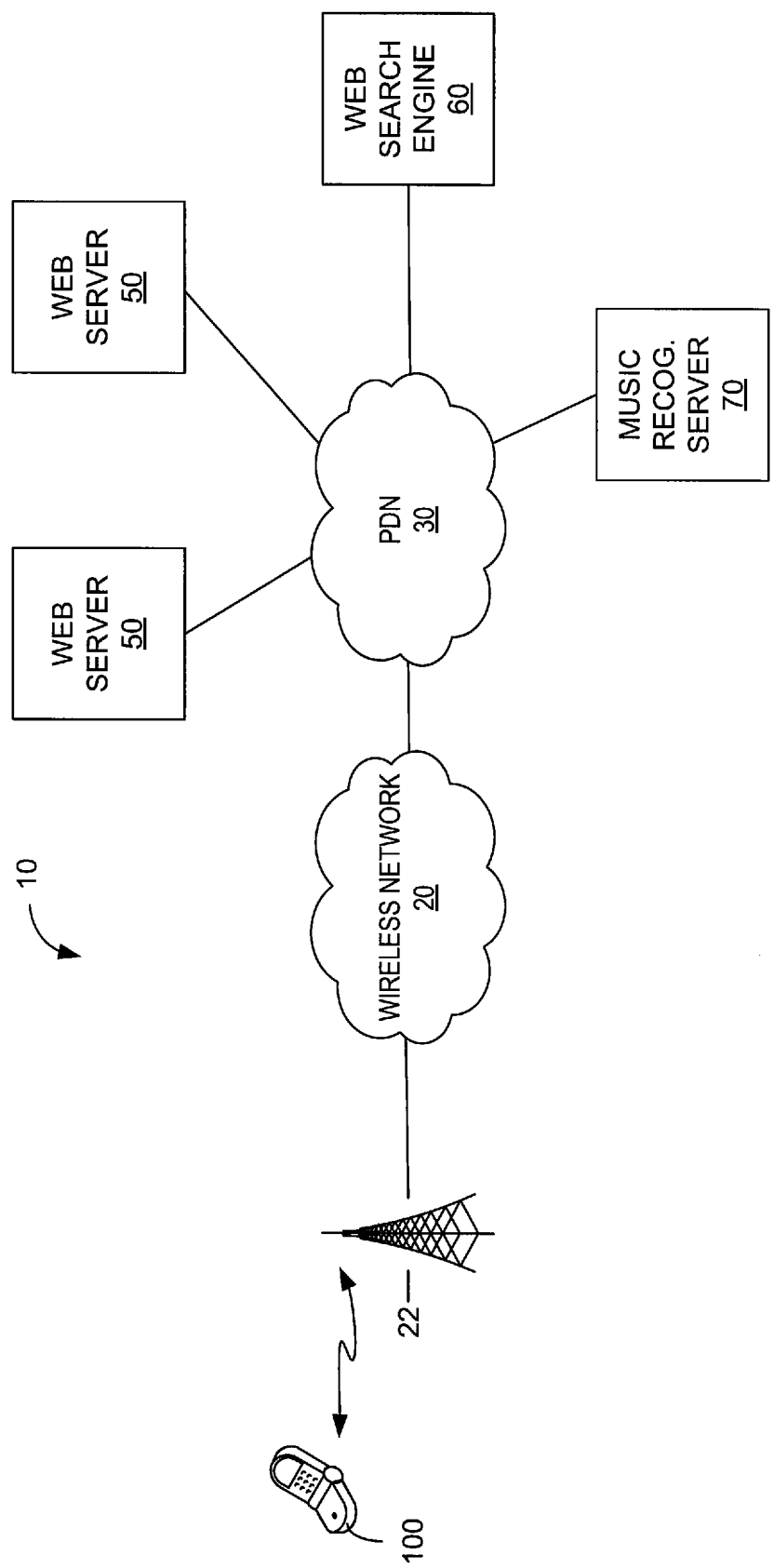
FIG. 1 illustrates an exemplary communication network according to one exemplary embodiment of the invention.

Referring now to the drawings, FIG. 1 illustrates an exemplary communication network 10 in which the present invention may be employed. The communication network 10 comprises a wireless network 20 having one or more base stations 22 for communicating with user devices 100. The wireless network 20 may comprise, for example, a conventional cellular communication network such as a Global System for Mobile Communications (GSM) network, Wideband Code Division Multiple Access (WCDMA) network, or other cellular communication network now known or hereafter developed. The user devices 100 may comprise, for example, cellular telephones, personal digital assistants (PDAs), laptop computers, or other wireless communication devices. As will be described in more detail below, the user devices 100 incorporate an audio player for playing audio files to the user, and a display for displaying visual content to the user.

The wireless network 20 connects to a packet data network (PDN) 30. The PDN 30 preferably comprises a public, wide area network (WAN) such as the Internet. Those skilled in the art will appreciate, however, that the present invention could be implemented in a private network or local area network (LAN).

A plurality of web servers 50 connect to the PDN 30. The web servers 50 comprise computers that are accessible through the PDN 30 for hosting websites that are accessible from remote computers. The websites hosted by a web server 50 typically comprise a collection of web pages, images, videos, and other digital content. Remote users can use a web browser or similar program installed in a user device 100 to access the resources of a website hosted by a web server 50. The web browser in the user device 100 and web server 50 typically use a protocol, such as the Hypertext Transfer Protocol (HTTP) to transfer information between the web server 50 and the user device 100.

A web search engine 60 is also connected to the PDN 30. The web search engine 60 is a search engine specifically designed to search for information on web servers 50 connected to the PDN 30. Web search engines typically provide a web interface which is accessible by web browsers in the same manner as any other web page. The web search engine 60 accepts queries entered by the user through the web interface and returns search results that satisfy the query in the form of HTML pages. Exemplary search engines which are well known in the art include the Google search engine, MSN search engine, Yahoo search engine, and AltaVista search engine.

In some embodiments, a music recognition server 70 may also be connected to the PDN 30. The music recognition server 70 enables the identification of audio files by comparing samples taken from the audio file to a database. Thus, when provided with a sample of an audio file, the music recognition server 70 can return information about the audio file such as the artist, song title, album title, etc.

According to embodiments of the present invention, the user device 100 downloads and displays visual content from web servers 50 in response to the selection or playing of audio files by a user. When a user selects or plays an audio file, the artist's name, song title, album title, or other textual information related to the audio file is used to initiate a search via a web search engine 60 for publicly-accessible web pages containing related images. Related images may, for example, comprise album art, images of the performing artist, concert videos, etc. When search results are returned by the web search engine 60, the user's device filters the search results, downloads selected web pages from one or more web servers 50, extracts images from the web pages, and outputs the images to a display. The images can be displayed full screen or may be converted to wallpaper that is displayed in the background.

As one example, a user may select a song to be played. If the title of the song is known or the artist is known, the user device 100 may connect to the web search engine 60 and initiate a search for images or videos of the artist from the web server. Moreover, if the song is a recording of a live performance, the user device may initiate a search for images or video of the specific concert in which the song was performed based on the date and/or location of the concert. Also, the user device could initiate a search for images and videos related to the concert tour if the concert tour is known.

Figure 2:
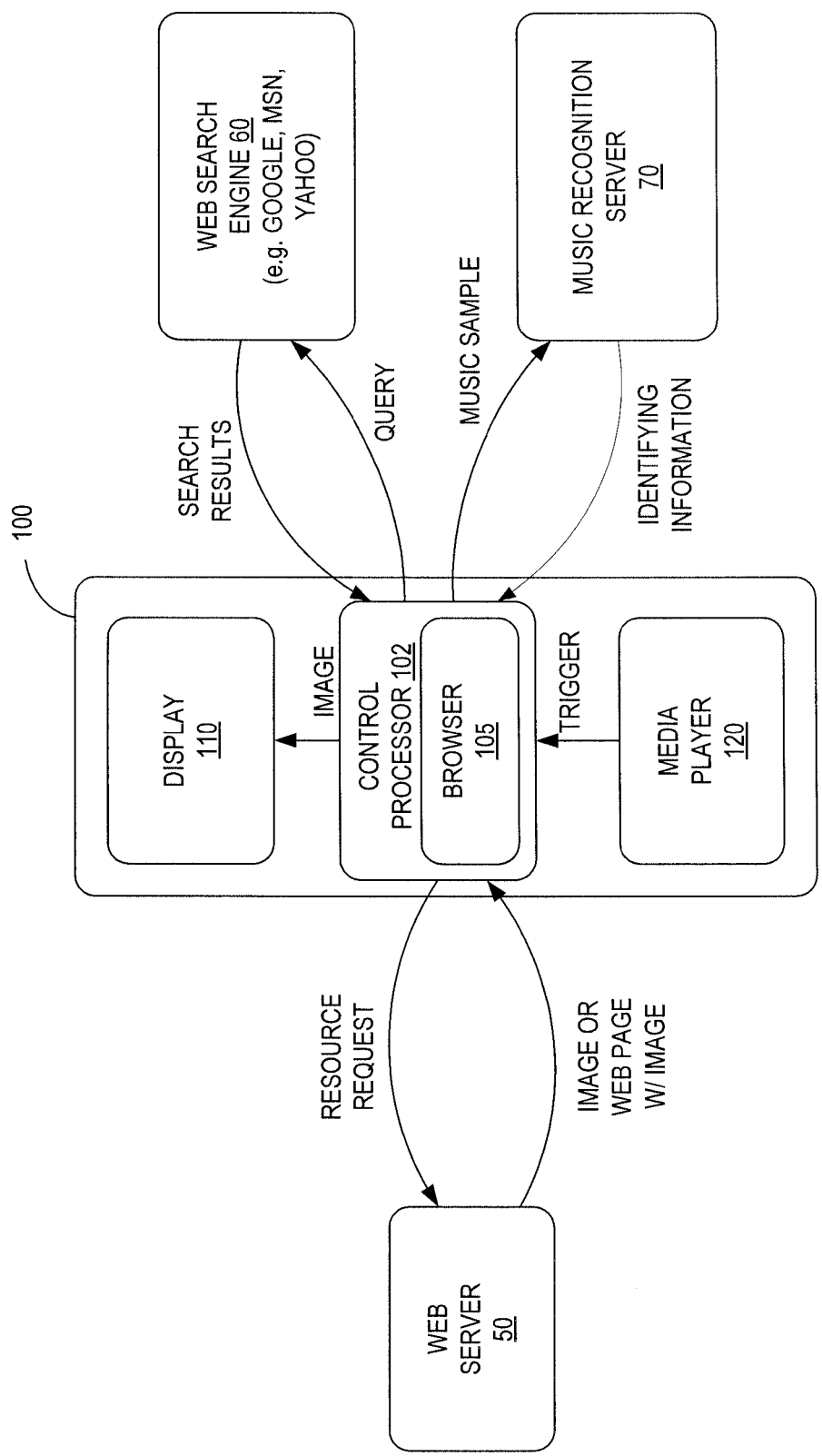
FIG. 2 illustrates an exemplary method for enhancing audio playback by displaying related images acquired in an Internet search.

FIG. 2 illustrates an exemplary method according to one embodiment of the present invention for dynamically downloading and displaying images related to an audio file that is being played. The user device 100, described in more detail below, comprises a media player 120, control processor 102, and display 110. The media player 120 may playback audio files stored in memory and/or stream audio from a remote server. When the user selects an audio file to be played or streamed, the media player 120 generates a trigger that is received by a control processor 102. In response to the trigger, the control processor 102 activates a web browser 105. The web browser 105 in turn sends a query to a web search engine 60 to initiate a search for web pages containing related images. The browser 105 may use descriptive information about the selected audio file, such as a song title, artist, album title, or other textual information to formulate the query. In some embodiments of the invention, the descriptive information may comprise a sample of the audio file which can be submitted to a music recognition server 70 accessible through the PDN 30 to obtain identifying information that can then be used to formulate a query.

The web search engine 60 is preferably a publicly-accessible web search engine such as a Google search engine, MSN search engine, Yahoo search engine, AltaVista search engine, or the like. The web search engine 60 returns a list of web pages matching the search criteria to the web browser 105 in the user device 100. After receiving the list of web pages from the web server 60, the browser 105 may apply a filter to reduce the list of web pages returned by the search engine 60. For example, the filter may be designed to exclude web pages on a "blocked" list and/or include web pages on an "allowed" list. In some embodiments, the user may specify a list of "preferred" web sites. In this case, the filter may exclude all web pages except those from "preferred" web sites. In some cases, the web search engine 60 may allow searching of specified domains. In this case, the "preferred" list can be used to formulate a query that returns results only from the specified domains avoiding the need for a separate filtering step at the user device 100 since the filtering is done by the web search engine.

After filtering the list of web pages returned by the web search engine 60, the browser 105 ranks the web pages according to some predetermined criteria and selects one or more of the web pages. The web pages may be ranked, for example, based on factors such as relevance, popularity, content rating, etc. The ranking algorithm may consider multiple criteria in the ranking. Once the web pages are ranked, the web browser 105 selects one or more web pages in order of ranking and downloads the web pages from corresponding web servers 50 in a conventional manner. More specifically, the web browser 105 may send a resource request, e.g., uniform resource locater (URL) to a web server 50 to request resources of the web server 50. In response to the resource request, the web server 50 returns the requested resources.

The resource request sent by the web browser 105 may comprise a request for a web page containing one or more images. In this case, the browser 105 downloads the web page and extracts the image or images from the web page. In other embodiments, the resource request may comprise the request for a specific image. In some situations, the web browser 105 may need to make multiple requests. For example, the web page received by the web browser 105 may contain links to images. In this case, the web browser 105 can parse the HTML of the web page to identify the images, and send an additional resource requests to download the images. After the browser 105 has downloaded the images and/or extracted the images from the web pages, the control processor 102 outputs the images to the display 106. If more than one image is downloaded, each image can be displayed in sequence for a predetermined period of time in a manner similar to a slide show. The images may be displayed full screen in a browser window on top of the user's desktop. If more than one image is selected, the images can be displayed as a slide show. Alternatively, the control processor 102 may convert the images to wallpapers that are displayed in the background.

Figure 3:
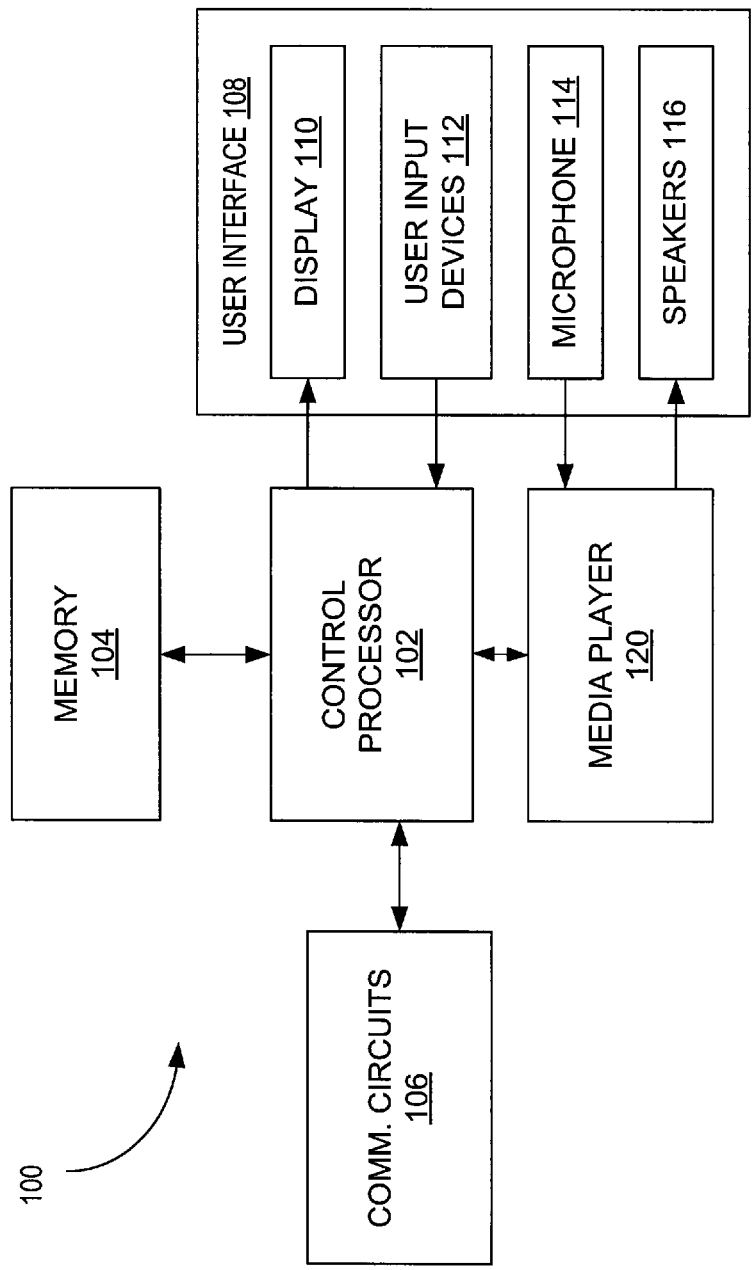
FIG. 3 illustrates an exemplary user device for enhancing audio playback by displaying related images acquired in an Internet search.

FIG. 3 illustrates an exemplary user device for downloading and displaying images in more detail. The user device 100 comprises a control processor 102, memory 104, communication circuits 106, and user interface 108. The control processor 102 controls overall operation of the user device 100 according to instructions stored in memory 104. The control processor 102 may comprise one or more microprocessors, microcontrollers, hardware circuits, or any combination thereof. Memory 104 comprises both volatile and non-volatile memory for storing instructions and data needed by the control processor 102. Memory 104 may include one or more memory devices, which may be internal or external memory devices.

The communication circuits 106 enable the user device 100 to communicate with wireless networks 20. The communication circuits 106 may comprise, for example, a fully-functional cellular transceiver operating according to any standard now known or hereinafter developed. Exemplary transceivers include transceivers implementing the GSM and WCDMA standards. The communication circuits 106 may further comprise a wireless LAN transceiver implementing the 802.11 family of standards.

The user interface 108 enables the user to interact with, and control, the user device 100. The user interface 108 comprises a display 110, user input devices 112, microphone 114, and one or more speakers 116. The display 110 may, for example, comprise a liquid crystal display. The user input devices 112 comprise any conventional input devices, such as a keyboard, keypad, pointing device (e.g., mouse, touchpad, etc.), joystick, or other user controls. In some embodiments, the display 110 may comprise a touchscreen display that also functions as a user input device 112. The processor 102 receives user input via one or more user input devices 112 and outputs information to the display 110 for viewing by the user.

Figure 4:
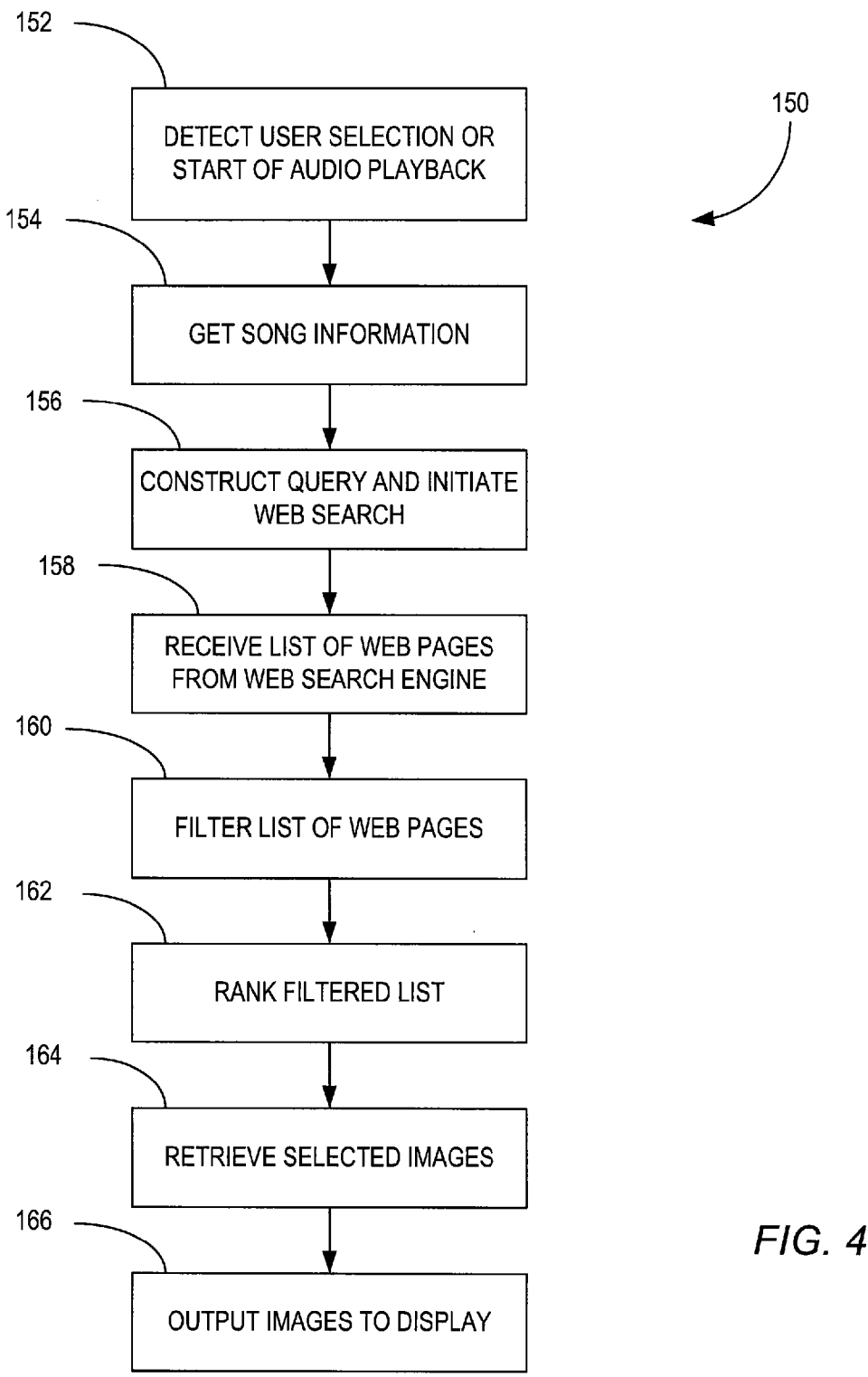
FIG. 4 illustrates an exemplary method implemented by a user device enhancing audio playback by displaying related images acquired in an Internet search.

Microphone 114 and speaker 116 provide audio input and output capabilities to the user device 100. The microphone 114 detects audible sounds and converts the audible sounds into audio signals that can be processed by the control processor 102. The speaker 116 converts audio signals output from the control processor 102 into audible sounds that can be heard by the user. For example, the speakers 116 may be used to play audio files stored by the user device 100 or streamed FIG. 4 illustrates an exemplary method implemented by a control processor 102 in the user device 100 for enhancing a user's audio playback experience. The music enhancement feature can be activated, either manually by the user or automatically by the control processor 102 based on user preferences. The method 150 begins when the user selects a song for playback or when audio playback starts (block 152). It is assumed that the music enhancement feature is activated. In response to user selection or the start of audio playback, the control processor 102 determines relevant information such as the song title, artist, album title, etc (block 154). Such information may be encoded in the audio file being played, stored in a database within the user device 100, or retrieved from a music recognition server 70 based on a supplied audio sample. The control processor 102 then constructs a query, connects to a web search engine 60, and initiates a web search for web pages containing related images (block 156) In response, the control processor 102 receives a list of web pages from the web server 60 containing one or more images (block 158). In some embodiments, the control processor 102 filters the web pages returned by the web server 60 (block 160). As noted above, filtering may be based on a predefined filter list, such as a "blocked" list, an "allowed" list, or a "preferred" list. In other embodiments, a "preferred" list can be used to construct the original query, thereby avoiding the need to filter the web page list at the control processor 102. The control processor 102 ranks any web pages remaining after filtering based on predetermined criteria, such as relevance, popularity, content rating, or a combination thereof (block 162) Once the pages are ranked, the control processor 102 selects one or more web pages in the order of ranking and retrieves images from the selected web pages (block 164). The control processor 102 then outputs the selected web pages to a display (block 166). In some embodiments, the images may be displayed in an overlaid browser window. If more than one image is selected, the images can be displayed as a slideshow. In other embodiments, the processor may convert the images into wallpaper that is displayed in the background.

The process described above for retrieving and displaying visual content may also be adapted for the situation where the audio is picked up by the microphone 114. For example, if the user is in a public location where music is being played, the user could manually activate a music enhancement mode. In this scenario, the music picked up by the microphone 114 can be sampled and the sample sent to a music recognition server 70. When the music recognition server 70 returns textual information about the music being played, the control processor 102 may cause the web browser 105 in the user device 100 to initiate a search for images as previously described.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of displaying images related to an audio file on a display of a networked device, the method comprising:
    playing an audio file using a media player associated with the networked device;
    identifying text information related to the audio file;
    accessing a public web search engine responsive to receiving a trigger from the media player;
    providing search criteria based on said text information to said web search engine and initiating a search for public web pages containing related images;
    receiving a list of web pages containing related images from said web search engine;
    filtering said list of web pages returned by said web search engine based on criteria identified in one or more filter lists stored in memory, and selecting images for display from the filtered list of web pages; and
    displaying one or more related images from the web pages on the display of the networked device while the audio file is being played.

2. The method of claim 1 wherein identifying text information related to the audio file comprises capturing an audio sample from the audio file and identifying text information related to the audio file based on the captured audio sample.

3. The method of claim 1 wherein identifying text information related to the audio file comprises extracting text information encoded with the audio file.

4. The method of claim 1 wherein said text information comprises at least one of an artist, song title, and collective work title.

5. The method of claim 1 wherein filtering said list of web pages returned by said web search engine comprises filtering said list of web pages based on at least one of an allowed list, a blocked list, and a preferred list.

6. The method of claim 1 further including downloading one or more web pages remaining after filtering, and extracting images from the downloaded web pages.

7. The method of claim 1 further comprising ranking said list of web pages returned by said web search engine, and selecting images to display based on said ranking.

8. An audio playback device comprising:
    media player configured to render audio files;
    a display; and
    control processor coupled to said media player and speakers and configured to:
    identify text information related to an audio file being played;
        connect to a public web search engine responsive to a trigger received from the media player;
        provide search criteria based on said text information to said web search engine and initiate a search by the web search engine for public web pages containing related images;
        receive a list of web pages containing related images from said web search engine;
        filter said list of web pages returned by said web search engine based on criteria identified in one or more filter lists stored in memory, and select images for display from the filtered list of web pages; and
        output one or more related images from the web pages returned by the web search engine to the display of the audio playback device while the audio file is being played.

9. The audio playback device of claim 8 wherein the control processor is configured to identify text information related to the audio file by capturing an audio sample from the audio file and identifying text information related to the audio file based on the captured audio sample.

10. The audio playback device of claim 8 wherein the control processor is configured to identify text information related to the audio file by extracting text information encoded with the audio file.

11. The audio playback device of claim 8 wherein said text information comprises at least one of an artist, song title, and collective work title.

12. The audio playback device of claim 8 wherein the control processor is further configured to filter said list of web pages returned by said web search engine based on at least one of an allowed list, a blocked list, and a preferred list.

13. The audio playback device of claim 8 wherein the control processor is further configured to download one or more web pages remaining after filtering, and to extract images from the downloaded web pages.

14. The audio playback device of claim 8 wherein the control processor is further configured to rank said list of web pages returned by said web search engine, and to select images for display based on said ranking.

* * * * *